(12) United States Patent
Suzuki

(10) Patent No.: US 9,898,673 B2
(45) Date of Patent: Feb. 20, 2018

(54) BIOMETRICS AUTHENTICATION DEVICE AND BIOMETRICS AUTHENTICATION METHOD

(71) Applicant: FUJITSU FRONTECH LIMITED, Tokyo (JP)

(72) Inventor: Tomoharu Suzuki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 15/236,990

(22) Filed: Aug. 15, 2016

(65) Prior Publication Data

US 2016/0350608 A1 Dec. 1, 2016

Related U.S. Application Data

(63) Continuation of application No. PCT/JP2014/058383, filed on Mar. 25, 2014.

(51) Int. Cl.
  *G06K 9/00* (2006.01)
  *G06F 21/32* (2013.01)
  *G06K 9/46* (2006.01)
  *G06K 9/62* (2006.01)

(52) U.S. Cl.
  CPC ......... *G06K 9/00885* (2013.01); *G06F 21/32* (2013.01); *G06K 9/00006* (2013.01); *G06K 9/4604* (2013.01); *G06K 9/623* (2013.01); *G06K 9/6215* (2013.01); *G06K 2009/00932* (2013.01)

(58) Field of Classification Search
  CPC .......... G06F 21/32; G06K 2009/00932; G06K 9/00006; G06K 9/00885; G06K 9/4604; G06K 9/6215; G06K 9/623
  See application file for complete search history.

(56) References Cited

U.S. PATENT DOCUMENTS

| 6,282,304 B1 | 8/2001 | Novikov |
| 7,072,525 B1 | 7/2006 | Covell |
| 7,359,555 B2 | 4/2008 | Porikli |

(Continued)

FOREIGN PATENT DOCUMENTS

| JP | 2000-358025 | 12/2000 |
| JP | 2005-149455 | 6/2005 |

(Continued)

OTHER PUBLICATIONS

Extended EP Search Report issued in European patent application No. 14886867.2, dated Apr. 20, 2017.

(Continued)

*Primary Examiner* — Phuoc Tran

(74) *Attorney, Agent, or Firm* — Greer Burns & Crain Ltd.

(57) ABSTRACT

A biometrics authentication device is configured so as to include: a PLDI (Principal-Line Dependent Index) generating unit that extracts directional features that respectively correspond to directions different from each other from an image, and generates a PLDI (Principal-Line Dependent Index) indicating dependency of a principal line on the basis of the directional features; a PLDI (Principal-Line Dependent Index) matching processing unit that determines a second degree of similarity between the PLDI and a registered PLDI; and a determining unit that determines identity by using a first degree of similarity.

6 Claims, 5 Drawing Sheets

(56) References Cited

U.S. PATENT DOCUMENTS

| | | | |
|---|---|---|---|
| 7,496,214 | B2 | 2/2009 | Zhang |
| 7,636,455 | B2 | 12/2009 | Keaton |
| 7,903,880 | B2 | 3/2011 | Wyatt |
| 8,077,932 | B2 | 12/2011 | Togashi |
| 8,285,010 | B2 | 10/2012 | Rowe |
| 8,953,854 | B2 | 2/2015 | Kumar |
| 9,280,805 | B2 | 3/2016 | Esaki |
| 9,317,761 | B2 | 4/2016 | Kong |
| 2004/0042645 | A1 | 3/2004 | Wang |
| 2004/0057606 | A1 | 3/2004 | David et al. |
| 2005/0084155 | A1 | 4/2005 | Yumoto et al. |
| 2005/0281438 | A1* | 12/2005 | Zhang ............... G06K 9/00067 382/115 |
| 2006/0020203 | A1 | 1/2006 | Tamura |
| 2006/0126916 | A1 | 6/2006 | Kokumai |
| 2006/0147096 | A1 | 7/2006 | Lee |
| 2007/0217660 | A1 | 9/2007 | Komura et al. |
| 2008/0298642 | A1 | 12/2008 | Meenen |
| 2009/0185746 | A1 | 7/2009 | Mian |
| 2009/0245593 | A1 | 10/2009 | Suzuki et al. |
| 2009/0245648 | A1 | 10/2009 | Hara |
| 2009/0268951 | A1* | 10/2009 | Zhang ............... G06K 9/00087 382/115 |
| 2012/0108973 | A1 | 5/2012 | Osumi |
| 2012/0194662 | A1* | 8/2012 | Zhang ............... G06K 9/00033 348/77 |
| 2012/0201431 | A1 | 8/2012 | Komura et al. |
| 2013/0004028 | A1 | 1/2013 | Jones |
| 2013/0136327 | A1 | 5/2013 | Kamei |
| 2013/0251213 | A1 | 9/2013 | Nada et al. |
| 2014/0133711 | A1 | 5/2014 | Abe |
| 2015/0020181 | A1 | 1/2015 | Iwata |
| 2015/0071538 | A1 | 3/2015 | Marchisio |
| 2015/0261299 | A1 | 9/2015 | Wajs |

FOREIGN PATENT DOCUMENTS

| | | |
|---|---|---|
| JP | 2006-500662 A | 1/2006 |
| JP | 2006-301881 | 11/2006 |
| JP | 2007-249339 | 9/2007 |
| JP | 2009-237621 A | 10/2009 |
| JP | 2009-245347 | 10/2009 |
| JP | 2009-301104 | 12/2009 |
| JP | 2012-73684 | 4/2012 |
| JP | 5363587 B2 | 9/2013 |
| JP | 2013-200673 | 10/2013 |
| WO | WO 2011/052085 A1 | 5/2011 |
| WO | WO 2012/020718 A1 | 2/2012 |
| WO | WO 2013/136553 A1 | 9/2013 |

OTHER PUBLICATIONS

Office Action issued in corresponding Japanese patent application No. 2014-062775, dated May 2, 2017 (full machine translation).
Wei Li et al., "Principal Line-Based Alignment Refinement for Palm Print Recognition.", vol. 42, No. 6, pp. 1491-1499; Nov. 1, 2012.
Zhen-Hua Guo et al., "Palmprint recognition using Gabor magnitude code", pp. 796-801; Jul. 11, 2010.
Kumar A. et al., "Personal authentication using multiple palm print representation", vol. 38, No. 10, pp. 1695-1704; Oct. 1, 2005.
Hany F. Arid et al., "Optimally Rotation-Equivariant Directional Derivative Kernels?", Sep. 10, 1997.
Keiji Yamada et al., "Consideration on Stability of Gabor Feature Extraction and Character Recognition Application", vol. 92, No. 433; Jan. 21, 1993 (with partial English translation).
Kijja Srimuang et al. "Detection of a Person Face and Head Pose Estimation using the Gabor wavelet.", vol. 2004, No. 119; (with partial English translation).
Kazuhiro Hotta et al., "Object Detection Method Based on Maximun Cliques", vol. 2002, No. 114, p. 49-56; Nov. 29, 2002 (with partial English translation).
Hiroshi Yoshimura et al, "Efficacy Evaluation of Directional Edge Component Projection Method for Caption Recognition", vol. 99, No. 649, p. 17-22; Feb. 22, 2000 (with partial English translation).
Jialiang Peng et al., "Finger-vein Verification Using Gabor Filter and SIFT Feature Matching" p. 45-48; Jul. 18, 2012.
Yang Wenming et al.; "Comparative competitive coding for personal identification by using finger vein and finger dorsal texture fusion" Information Sciences, vol. 268, p. 20-32; Oct. 21, 2013.
Int'l. Search Report issued in Int'l. App. No. PCT/JP2014/058383, dated May 13, 2014.
A. Ross et al.; "A hybrid fingerprint matcher"; Pattern Recognition, vol. 36, No. 7, pp. 1661-1673; 2003.
ESSR issued in corresponding EP patent application No. 14887606. 3, dated Jan. 20, 2017.
Office action issued in corresponding Japanese patent application No. 2016-509684, dated Dec. 20, 2016 (with full machine translation).
Office action issued in corresponding Japanese patent application No. 2016-509683, dated Dec. 20, 2016 (with full machine translation).
ESSR issued in corresponding EP patent application No. 14887446. 4, dated Feb. 9, 2017.
Chaudhuri S. et al.; Detection of Blood Vessels in Retinal Images Using Two- Dimensional Matched Filters, IEEE Service Center, vol. 8, No. 3, Sep. 1, 1989.
A1 Bovik "Handbook of Image and Video Processing (First Edition)"; May 31, 2001.
Int'l. Search Report issued in Int'l. App. No. PCT/JP2014/058334, dated May 13, 2014.
Int'l. Search Report issued in Int'l. App. No. PCT/JP2014/058385, dated May 13, 2014.
Int'l. Search Report issued in Int'l. App. No. PCT/JP2015/059213, dated Jun. 16, 2015.
Written Opinion (PCT/ISA/237) dated Jun. 16, 2015 (with partial translation).
U.S. Appl. No. 15/265,189, filed Sep. 14, 2016.
U.S. Appl. No. 15/266,012, filed Sep. 15, 2016.
U.S. Appl. No. 15/266,067, filed Sep. 15, 2016.
Office action issued in U.S. Appl. No. 15/266,012, dated Oct. 19, 2017.
Office action issued in U.S. Appl. No. 15/265,189, dated Oct. 13, 2017.

* cited by examiner

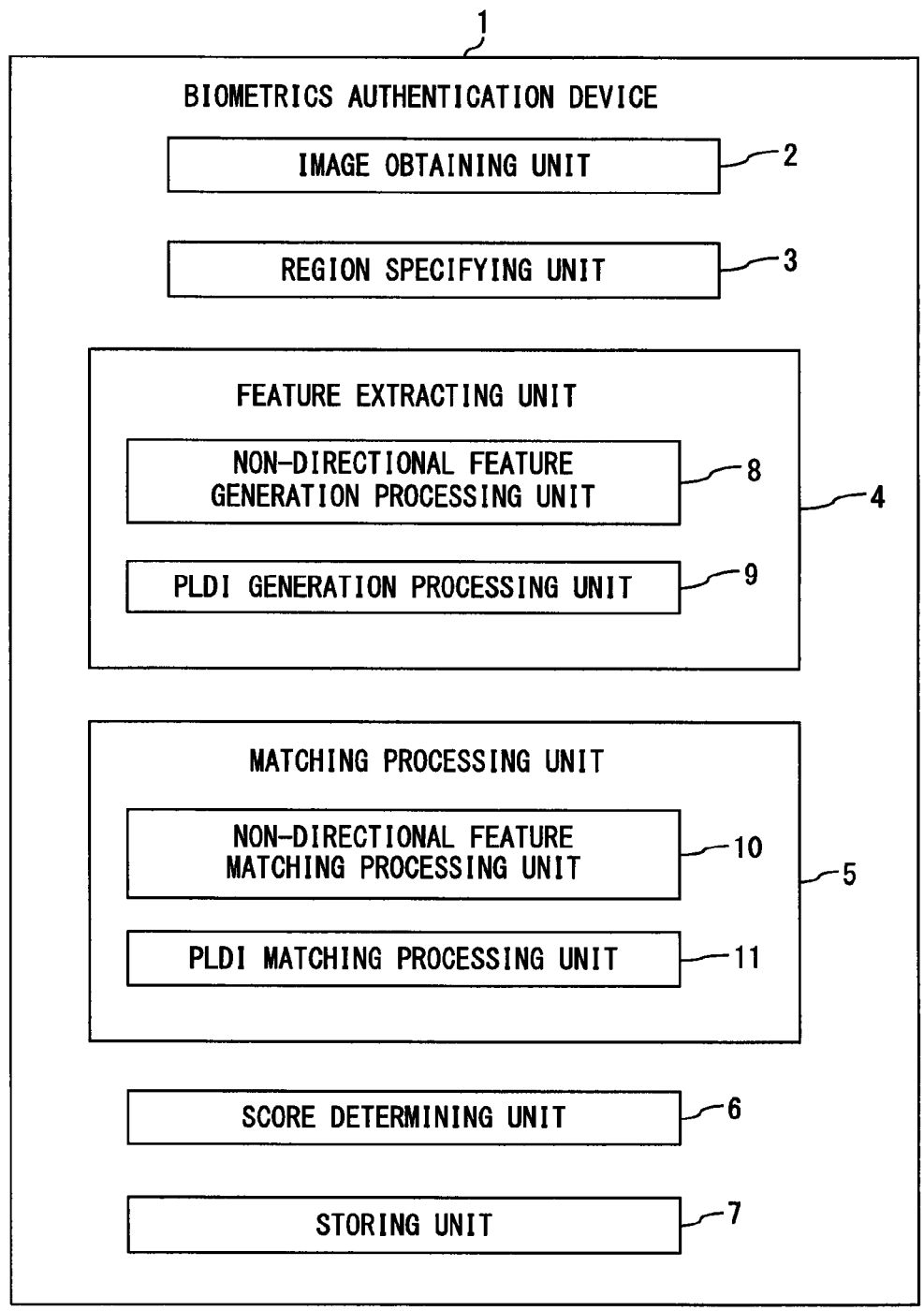
F I G. 1

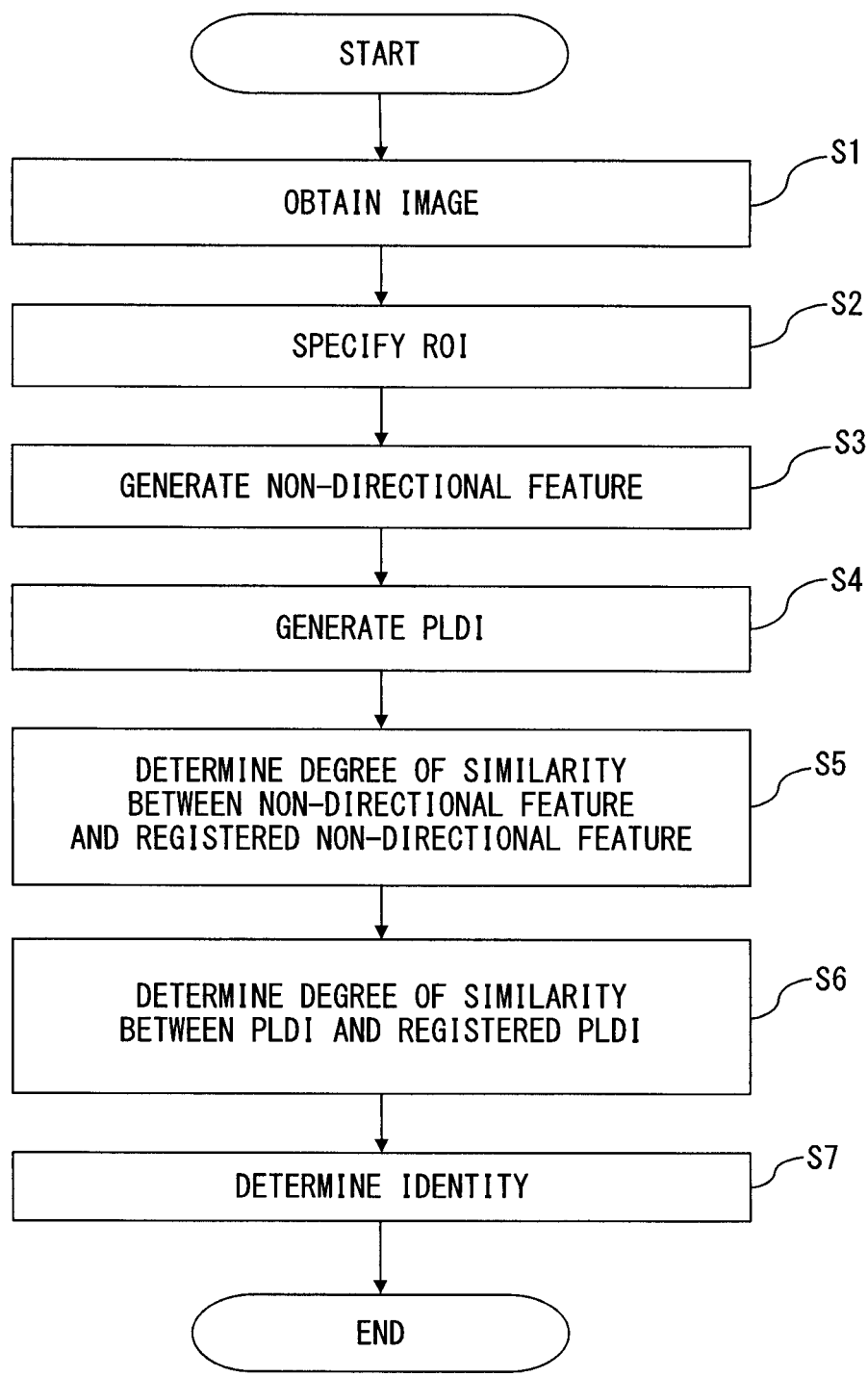
F I G. 2

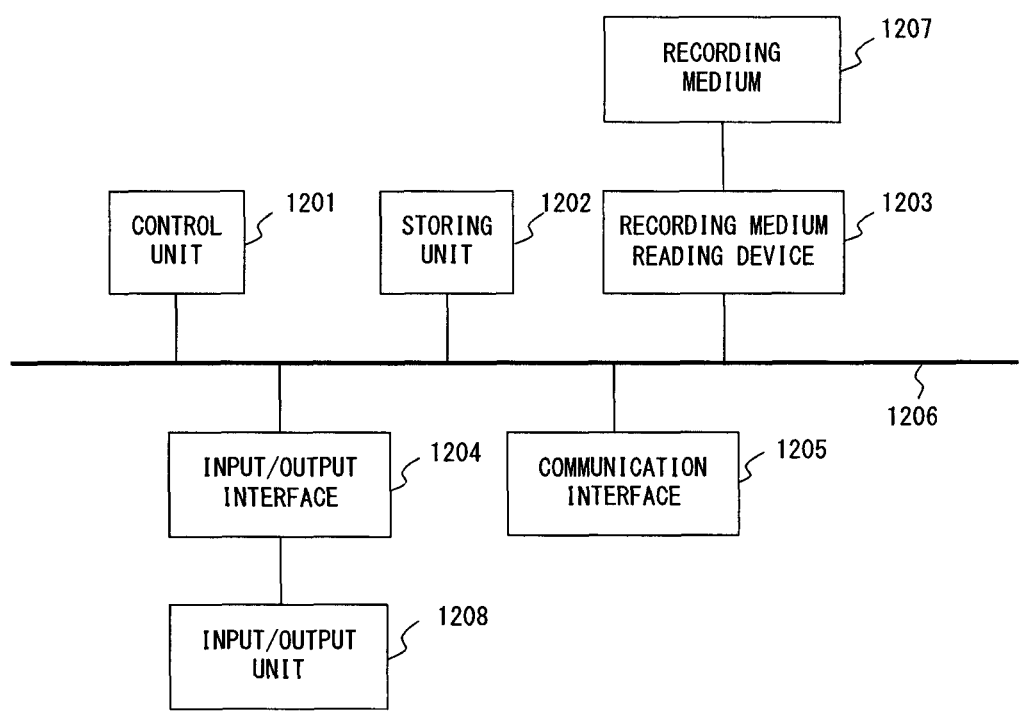
F I G. 5

BIOMETRICS AUTHENTICATION DEVICE AND BIOMETRICS AUTHENTICATION METHOD

CROSS-REFERENCE TO RELATED APPLICATION

This application is continuation application of International Application PCT/JP2014/058383 filed on Mar. 25, 2014 and designated the U.S., the entire contents of which are incorporated herein by reference.

FIELD

Embodiments of the present disclosure relate to a technology for biometrics authentication.

BACKGROUND

In an existing biometrics authentication device, when biological information extracted from a photographed image and registered biological information match each other, identity is determined. The biological information includes features denoting a palm print, a vein, and the like, and when biometrics authentication is performed by using the feature denoting the vein, the feature denoting the palm print needs to be separated from the photographed image such that as far as possible only the feature denoting the vein is included in the biological information. As an example of a method for separating the feature denoting the palm print, a method for optically separating the feature denoting the palm print by using a polarizing filter is known. As another example of the method, a method using plural-wavelength photographing is known.

Related Art Document: A. Ross, A. K. Jain, and J. Reisman, "A Hybrid fingerprint matcher", Pattern Recognition, vol. 36, no. 7, pp. 1661-1673, 2003.

SUMMARY

A biometrics authentication device according to an embodiment of the present disclosure includes: a PLDI (Principal-Line Dependent Index) generating unit that extracts directional features that respectively correspond to directions different from each other from an image that has been input, and generates a PLDI (Principal-Line Dependent Index) indicating dependency of a principal line on the basis of the directional features; a PLDI (Principal-Line Dependent Index) matching processing unit that determines a first degree of similarity between the PLDI and a registered PLDI stored in a storing unit; and a determining unit that determines identity by using the first degree of similarity.

Further, a biometrics authentication method according to an embodiment of the present disclosure includes: extracting, by a computer, directional features that respectively correspond to directions different from each other from an image that has been input, and generating a PLDI (Principal-Line Dependent Index) indicating dependency of a principal line on the basis of the directional features; determining, by the computer, a first degree of similarity between the PLDI and a registered PLDI stored in a storing unit; and determining, by the computer, identity by using the first degree of similarity.

Furthermore, a non-transitory computer-readable recording medium according to an embodiment of the present disclosure which records a program causes a computer to execute a process including: extracting directional features that respectively correspond to directions different from each other from an image that has been input, and generating a PLDI (Principal-Line Dependent Index) indicating dependency of a principal line on the basis of the directional features; determining a first degree of similarity between the PLDI and a registered PLDI stored in a storing unit; and determining identity by using the first degree of similarity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of a biometrics authentication device according to an embodiment.

FIG. 2 is a flowchart illustrating a biometrics authentication method according to an embodiment.

FIG. 5 illustrates an example of hardware of a biometrics authentication device.

DESCRIPTION OF EMBODIMENTS

Figure 3:
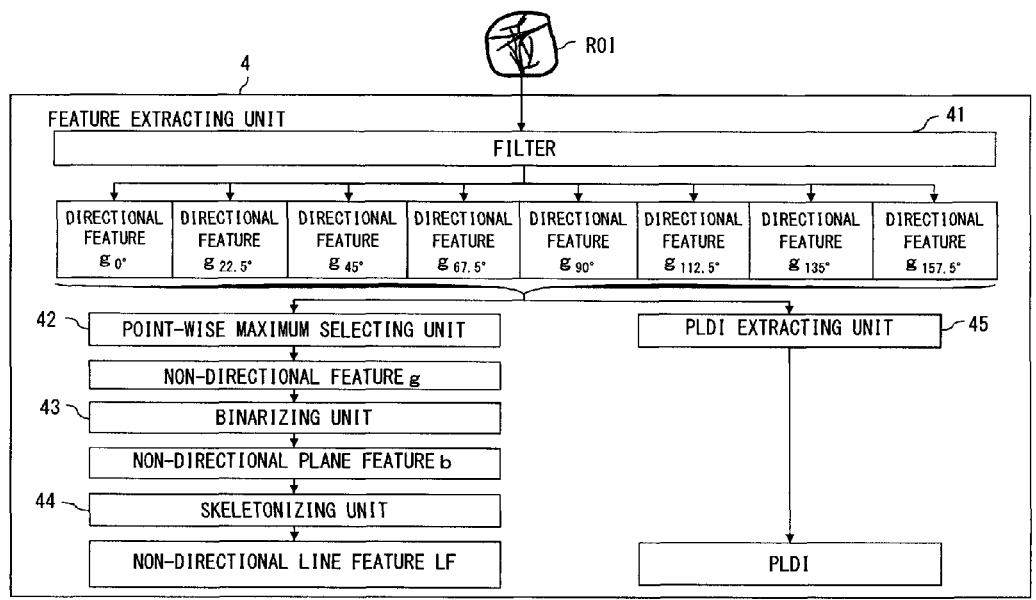
FIG. 3 illustrates an example of a feature extracting unit according to an embodiment.

FIG. 1 illustrates an example of a biometrics authentication device according to an embodiment of the present disclosure.

A biometrics authentication device 1 illustrated in FIG. 1 includes an image obtaining unit 2, a region specifying unit 3, a feature extracting unit 4, a matching processing unit 5, a score determining unit 6 (a determining unit), and a storing unit 7.

The feature extracting unit 4 includes a non-directional feature generation processing unit 8 and a PLDI (Principal-Line Dependent Index) generation processing unit 9.

The matching processing unit 5 includes a non-directional feature matching processing unit 10 and a PLDI matching processing unit 11.

FIG. 2 is a flowchart illustrating a biometrics authentication method according to an embodiment of the present disclosure.

First, the image obtaining unit 2 obtains an image of a hand of a subject (S1). As an example, the image obtaining unit 2 is an imaging device, and the image obtaining unit 2 obtains a captured image of a hand of a subject by using a single-plate image sensor and respective RGB color filters of a Bayer array.

Then, the region specifying unit 3 specifies a ROI (Region Of Interest) that corresponds to a palm of the subject in the image obtained by the image obtaining unit 2 (S2).

The non-directional feature generation processing unit 8 then generates a non-directional feature on the basis of an image f of the ROI specified by the region specifying unit 3 (S3). In a case in which filtering S is performed on an image f, the term "non-directional" is defined such that it obtains a result that is almost the same as a result of performing only the filtering S even when image rotation conversion $T_\theta$ or inverse conversion $T_\theta^{-1}$ of $T_\theta$ at various angles θ is inserted before the filtering S. Stated another way, the term "non-directional" is defined using symbols to be $S(f)=T_\theta^{-1}(S(T_\theta(f)))$ at an arbitrary angle θ.

The PLDI generation processing unit 9 generates a PLDI (Principal-Line Dependent Index) on the basis of the image f of the ROI (S4). Note that a line feature is a linear image.

The non-directional feature matching processing unit 10 determines a degree of similarity between the non-directional feature generated by the non-directional feature generation processing unit 8 and a registered non-directional feature that has been registered in advance and that has been stored in the storing unit 7 (S5).

The PLDI matching processing unit 11 determines a degree of similarity between the PLDI generated by the PLDI generation processing unit 9 and a registered PLDI that has been registered in advance and that has been stored in the storing unit 7 (S6).

The score determining unit 6 determines the identity of the subject according to the degree of similarity determined by the non-directional feature matching processing unit 10 and the degree of similarity determined by the PLDI matching processing unit 11 (S7).

FIG. 3 illustrates an example of the feature extracting unit 4 according to the embodiment of the present disclosure.

The feature extracting unit 4 illustrated in FIG. 3 includes a filter 41, a point-wise maximum selecting unit 42, a binarizing unit 43, a skeletonizing unit 44, and a PLDI extracting unit 45.

The filter 41 performs Gabor filtering on an input image f of the ROI in eight respective directions θ (0°, 22.5°, 45°, 67.5°, 90°, 112.5°, 135°, and 157.5°) so as to obtain respective filter responses (luminance values) as directional features $g_\theta$ (a directional feature $g_{0°}$, a directional feature $g_{22.5°}$, a directional feature $g_{45°}$, a directional feature $g_{67.5°}$, a directional feature $g_{90°}$, a directional feature $g_{112.5°}$, a directional feature $g_{135°}$, and a directional feature $g_{157.5°}$). The number of directions θ set in the filtering is not limited to eight, and may be any number that is greater than or equal to two. The filtering is not limited to Gabor filtering, and may be any type of filtering that has a high filter response to a linear dark portion in respective directions θ in the image f.

The point-wise maximum selecting unit 42 outputs a maximum directional feature $\max_\theta\{g_\theta(i,j)\}$ as a non-directional feature $g(i,j)$ from among the respective directional features $g_\theta(i,j)$ extracted from the filter 41, as expressed by Expression 1. The i represents a position in a horizontal-axis direction of two-dimensional coordinates, and the j represents a position in a vertical-axis direction of the two-dimensional coordinates, when positions of respective pixels within the ROI are made to correspond to positions on the two-dimensional coordinates.

$$g(i,j):=\max_\theta\{g_\theta(i,j)\}, \ (i,j)\in\text{ROI} \qquad \text{Expression 1}$$

The binarizing unit 43 outputs 1 as a non-directional plane feature $b(i,j)$ when the non-directional feature $g(i,j)$ output from the point-wise maximum selecting unit 42 has a positive value, and the binarizing unit 43 outputs 0 as the non-directional plane feature $b(i,j)$ when the non-directional feature $g(i,j)$ has a value that is not a positive value, as expressed by Expression 2. The obtained non-directional plane feature b is stored in the storing unit 7.

$$b(i,j) = \begin{cases} 1, & \text{if } g(i,j) > 0 \\ 0, & \text{other} \end{cases} \qquad \text{Expression 2}$$

In the description above, the binarizing unit 43 has performed binarization by performing simple thresholding using a constant of 0, but the binarizing unit 43 may perform binarization using a more advanced Adaptive-thresholding scheme.

The skeletonizing unit 44 performs skeletonizing on the non-directional plane feature b so as to obtain a non-directional line feature LF, as expressed by Expression 3. The skel represents skeletonizing. The obtained non-directional line feature LF is stored in the storing unit 7.

$$LF:=\text{skel}(b) \qquad \text{Expression 3}$$

The PLDI extracting unit 45 generates a PLDI indicating dependency of a principal line (principally, a line that corresponds to a palm print) within the ROI on the basis of the respective directional features $g_\theta$ extracted from the filter 41. As an example, the PLDI extracting unit 45 selects a maximum directional feature MAX(i,j) from among the respective directional features $g_\theta(i,j)$ output from the filter 41. The PLDI extracting unit 45 selects a minimum directional feature MIN(i,j) from among the respective directional features $g_\theta(i,j)$ output from the filter 41. The PLDI extracting unit 45 also obtains an average value AVE(i,j) of the respective directional features $g_\theta(i,j)$ output from the filter 41. Then, the PLDI extracting unit 45 determines a value obtained by dividing a difference between the maximum directional feature MAX(i,j) and the minimum directional feature MIN(i,j) by the average value AVE(i,j) to be a PLDI(i,j).

Note that a method for obtaining a PLDI (i,j) is not limited to the method above.

Figure 4:
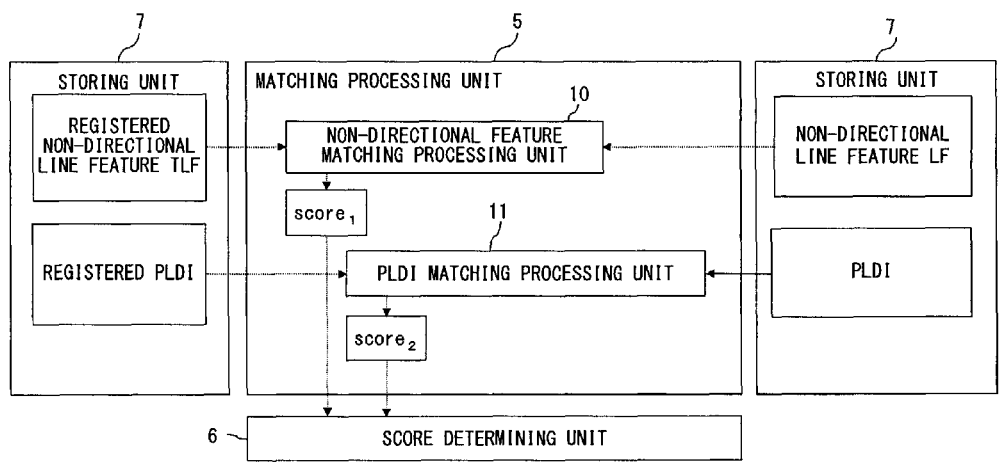
FIG. 4 illustrates an example of a matching processing unit according to an embodiment.

FIG. 4 illustrates an example of the matching processing unit 5 according to the embodiment of the present disclosure.

The non-directional feature matching processing unit 10 determines a degree of similarity $score_1$ between the non-directional line feature LF that has been output from the skeletonizing unit 44 and that has been stored in the storing unit 7 and a registered non-directional line feature TLF that has been registered in advance and that has been stored in the storing unit 7.

The PLDI matching processing unit 11 determines a degree of similarity $score_2$ between the PLDI that has been output from the PLDI extracting unit 45 and that has been stored in the storing unit 7 and a registered PLDI TPLDI that has been registered in advance and that has been stored in the storing unit 7.

The score determining unit 6 weights the degrees of similarity $score_1$ and $score_2$ by using a constant $a_k$ and a constant c, and the score determining unit 6 determines the sum of the weighted degrees of similarity scorer and $score_2$ to be a degree of similarity score, as expressed by Expression 4. Then, the score determining unit 6 determines the identity of the subject, for example, when the degree of similarity score is greater than or equal to a threshold.

$$\text{score} := \sum_{1 \leq k \leq 2} a_k * score_k + c \qquad \text{Expression 4}$$

Hereinafter, with respect to a certain k, when $a_k > 0$ is established and as an absolute value of the constant $a_k$ becomes relatively greater than another constant $a_k$, it is said that a degree of similarity $score_k$ is positively utilized (an action of positively affirming similarity). Otherwise, it is said that the degree of similarity $score_k$ is negatively utilized.

The score determining unit 6 applies a smaller weight on the degree of similarity $score_2$ as the degree of similarity $score_2$ attains a greater value, so as to negatively utilize the degree of similarity $score_2$.

As described above, by negatively utilizing the degree of similarity $score_2$, the identity of a subject can be determined in a state in which an influence of a palm print has been suppressed, and consequently authentication accuracy can be improved. Stated another way, the biometrics authentication device 1 according to the embodiment of the present disclosure can prevent the FAR from increasing even when a method for physically separating a feature denoting the palm print from an image fails to be applied. Further, even when melanin is abnormally deposited, in particular, in a palm of a subject, and a large portion indicating the palm print is included in a non-directional line feature LF, the identity of the subject can be determined in a state in which an influence of the palm print on the non-directional line feature LF has been suppressed, and consequently the FAR can be reduced.

In the embodiment above, the degrees of similarity $score_1$ and $score_2$ are determined, and the identity of a subject is determined by using the degrees of similarity $score_1$ and $score_2$. However, only the degree of similarity $score_2$ may be determined, and the identity of the subject may be determined by using only the degree of similarity $score_2$. This allows the identity of the subject to be determined by using only the degree of similarity $score_2$, namely, by using only a feature indicating a palm print, and even when a method for physically separating the feature denoting the palm print from an image fails to be applied, the FAR can be prevented from increasing.

Further, the degrees of similarity $score_1$ and $score_2$ may be determined, the identity of a subject may be determined by using only the degree of similarity $score_2$ when a PLDI has a great value (for example, when the PLDI has a value greater than or equal to a threshold), and the identity of the subject may be determined by using the degrees of similarity $score_1$ and $score_2$ when the PLDI has a small value (for example, when the PLDI has a value smaller than a threshold). By doing this, multimodal authentication in which a plurality of authentication methods (modals) are switched and complementary authentication is performed can be performed.

FIG. 5 illustrates an example of hardware that configures the biometrics authentication device 1 according to the embodiment of the present disclosure.

As illustrated in FIG. 5, hardware that configures the biometrics authentication device 1 includes a control unit 1201, a storing unit 1202, a recording medium reading device 1203, an input/output interface 1204, and a communication interface 1205, and these components are mutually connected via a bus 1206. The hardware that configures the biometrics authentication device 1 may be implemented by using a cloud or the like.

As an example, a Central Processing Unit (CPU), a multicore CPU, or a programmable device (a Field Programmable Gate Array (FPGA), a Programmable Logic Device (PLD) or the like) can be considered to be used as the control unit 1201. The control unit 1201 corresponds to the region specifying unit 3, the feature extracting unit 4, the matching processing unit 5, and the score determining unit 6 illustrated in FIG. 1.

The storing unit 1202 corresponds to the storing unit 7 illustrated in FIG. 1, and examples of the storing unit 1202 include a memory such as a Read Only Memory (ROM) or a Random Access Memory (RAM), and a hard disk. The storing unit 1202 may be used as a work area at the time of execution. In addition, another storing unit may be provided outside the biometrics authentication device 1.

The recording medium reading device 1203 is controlled by the control unit 1201 so as to read data recorded in a recording medium 1207 or to write data to the recording medium 1207. The recording medium 1207 that is removable is a non-transitory computer-readable recording medium, and examples of the recording medium 1207 include a magnetic recording device, an optical disk, a magneto-optical recording medium, and a semiconductor memory. Examples of the magnetic recording device include a hard disk drive (HDD). Examples of the optical disk include a Digital Versatile Disc (DVD), a DVD-RAM, a Compact Disc Read Only Memory (CD-ROM), and a CD-R (Recordable)/RW (ReWritable). Examples of the magneto-optical recording medium include a Magneto-Optical disk (MO). Note that the storing unit 1202 is also included in the non-transitory recording medium.

The input/output interface 1204 is connected to an input/output unit 1208, and the input/output interface 1204 transmits information input by a user via the input/output unit 1208 to the control unit 1201 via the bus 1206. The input/output interface 1204 also transmits information transmitted from the control unit 1201 to the input/output unit 1208 via the bus 1206.

The input/output unit 1208 corresponds to the image obtaining unit 2 illustrated in FIG. 1, and examples of the input/output unit 1208 include an imaging device. Examples of the input/output unit 1208 also include a keyboard, a pointing device (for example, a mouse), a touch panel, a Cathode Ray Tube (CRT) display, and a printer.

The communication interface 1205 is an interface for performing Local Area Network (LAN) connection or Internet connection. The communication interface 1205 may be used as an interface for performing LAN connection, Internet connection, or wireless connection with another computer, as needed.

By using a computer having the hardware above, various processing functions performed by the biometrics authentication device 1 are implemented. In this case, a computer executes a program describing the content of the various processing functions performed by the biometrics authentication device 1 such that the above various processing functions (for example, the region specifying unit 3, the feature extracting unit 4, the matching processing unit 5, and the score determining unit 6) are implemented on the computer. The program describing the content of the various processing functions can be stored in the storing unit 1202 or the recording medium 1207.

In a case in which a program is distributed, the recording medium 1207 recording the program, such as a DVD or a CD-ROM, is sold, for example. The program can be recorded in a storage of a server computer, and the program can be transferred from the server computer to another computer via a network.

The computer that executes a program stores, for example, the program recorded in the recording medium 1207 or the program transferred from the server computer in the storing unit 1202. The computer reads the program from the storing unit 1202, and performs processing according to the program. The computer may directly read a program from the recording medium 1207, and may perform processing according to the program. Further, every time a program is transferred from the server computer, the computer may perform processing according to the received program.

In the embodiment of the present disclosure, an image processing device that performs authentication using a vein of a palm has been described as an example, but the embodiment is not limited to this, and any other feature detection region of a living body may be used.

The other feature detection region of a living body is not limited to a vein, and as an example may be a vascular image of a living body, a pattern of a living body, a fingerprint or a palm print of a living body, the sole of the foot, a finger or toe, the back of the hand or the instep of the foot, the wrist, the arm, or the like.

When a vein is used for authentication, the other feature detection region of a living body may be any region in which the vein can be observed.

The existence of an other feature detection region of a living body in which biological information can be specified is advantageous to authentication. As an example, when a palm, a face or the like is used, a region can be specified from an obtained image. In addition, various modifications to the embodiment above can be made without departing from the gist of the embodiment. Further, multiple variations or modifications to the embodiment above can be made by those skilled in the art, and the embodiment is not limited to the exact configuration and applications described above.

According to the embodiment of the present disclosure, even when a method for physically separating a feature denoting a palm print from an image fails to be applied, an FAR can be prevented from increasing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometrics authentication device comprising:
   a computer configured to execute a program, the computer having
   a PLDI (Principal-Line Dependent Index) generating unit that extracts directional features that respectively correspond to directions different from each other from an image that has been input, and generates a PLDI (Principal-Line Dependent Index) obtained by dividing a difference between a maximum directional feature and a minimum directional feature from among the directional features by an average value of the directional features;
   a PLDI (Principal-Line Dependent Index) matching processing unit that determines a first degree of similarity between the PLDI and a registered PLDI stored in a storing unit; and
   a determining unit that determines identity by using the first degree of similarity.

2. The biometrics authentication device according to claim 1, the computer being further configured with:
   a non-directional feature generation processing unit that extracts the directional features that respectively correspond to the directions different from each other from the image, and generates a non-directional feature, the non-directional feature being a maximum directional feature from among the directional features; and
   a non-directional feature matching processing unit that determines a second degree of similarity between the non-directional feature and a registered non-directional feature stored in the storing unit, wherein
   the determining unit applies a smaller weight on the first degree of similarity as the first degree of similarity attains a greater value, and determines the identity by using the first degree of similarity and the second degree of similarity.

3. A biometrics authentication method comprising:
   extracting, by a computer, directional features that respectively correspond to directions different from each other from an image that has been input, and generating a PLDI (Principal-Line Dependent Index) obtained by dividing a difference between a maximum directional feature and a minimum directional feature from among the directional features by an average value of the directional features;
   determining, by the computer, a first degree of similarity between the PLDI and a registered PLDI stored in a storing unit; and
   determining, by the computer, identity by using the first degree of similarity.

4. The biometrics authentication method according to claim 3, comprising:
   extracting, by the computer, the directional features that respectively correspond to the directions different from each other from the image, and generating a non-directional feature on the basis of the directional features, the non-directional feature being a maximum directional feature from among the directional features;
   determining, by the computer, a second degree of similarity between the non-directional feature and a registered non-directional feature stored in the storing unit; and
   applying, by the computer, a smaller weight on the first degree of similarity as the first degree of similarity attains a greater value, and determining the identity by using the first degree of similarity and the second degree of similarity.

5. A non-transitory computer-readable recording medium which records a program for causing a computer to execute a process comprising:
   extracting directional features that respectively correspond to directions different from each other from an image that has been input, and generating a PLDI (Principal-Line Dependent Index) the directional features obtained by dividing a difference between a maximum directional feature and a minimum directional feature from among the directional features by an average value of the directional features;
   determining a first degree of similarity between the PLDI and a registered PLDI stored in a storing unit; and
   determining identity by using the first degree of similarity.

6. The non-transitory computer-readable recording medium according to claim 5, the process comprising:
   extracting the directional features that respectively correspond to the directions different from each other from the image, and generating a non-directional feature on the basis of the directional features, the non-directional feature being a maximum directional feature from among the directional features;
   determining a second degree of similarity between the non-directional feature and a registered non-directional feature stored in the storing unit; and
   applying a smaller weight on the first degree of similarity as the first degree of similarity attains a greater value, and determining the identity by using the first degree of similarity and the second degree of similarity.

* * * * *